United States Patent
Bourlas et al.

(10) Patent No.: US 7,937,090 B2
(45) Date of Patent: May 3, 2011

(54) SHORTHAND CONNECTION IDENTIFIER WITH EMBEDDED SUBFIELD

(75) Inventors: Yair Bourlas, San Diego, CA (US);
Todd Sutton, Del Mar, CA (US);
Srikanth Gummadi, San Diego, CA (US); Lei Wang, San Diego, CA (US)

(73) Assignee: Wi-LAN Inc., Ottawa, Ontario (CA)

( * ) Notice: Subject to any disclaimer, the term of this patent is extended or adjusted under 35 U.S.C. 154(b) by 985 days.

(21) Appl. No.: 11/616,210

(22) Filed: Dec. 26, 2006

(65) Prior Publication Data
US 2008/0153504 A1    Jun. 26, 2008

(51) Int. Cl.
*H04W 72/00*    (2009.01)
(52) U.S. Cl. ............. 455/452.1; 455/550.1; 370/331; 370/208
(58) Field of Classification Search .......... 370/208, 370/331
See application file for complete search history.

(56) References Cited

U.S. PATENT DOCUMENTS

| | | | |
|---|---|---|---|
| 2005/0122936 A1* | 6/2005 | Son et al. | 370/331 |
| 2005/0201269 A1* | 9/2005 | Shim et al. | 370/208 |
| 2006/0031924 A1 | 2/2006 | Kwon et al. | |

FOREIGN PATENT DOCUMENTS

| EP | 1542375 A1 | 6/2005 |
|---|---|---|
| EP | 1610522 A1 | 12/2005 |

* cited by examiner

*Primary Examiner* — David Q Nguyen
(74) *Attorney, Agent, or Firm* — Volpe and Koenig, P.C.

(57) ABSTRACT

A base station can communicate resource allocation to a wireless mobile station in an uplink map information element. The base station can identify destination mobile stations using a shorthand connection identifier. The base station parses the connection identifier field into a shorthand connection identifier field and an embedded subfield data field. The shorthand connection identifier field can be sized to support a predetermined number of mobile stations. The base station can further parse the embedded subfield field into a number of sub-fields, each communicating a different set of control information. In one embodiment, the base station utilizes the embedded subfield to communicate power, timing, and frequency information to the destination mobile station.

11 Claims, 8 Drawing Sheets

SHORTHAND CONNECTION IDENTIFIER WITH EMBEDDED SUBFIELD

BACKGROUND OF THE INVENTION

Wireless communication systems are under constant pressure to support increased data transfer rates. The desire to increase data rates often accompanies the desire to operate wireless communication devices in non-ideal environments, including mobile environments. The wireless communication systems often incorporate more complex hardware constraints in an attempt to maximize the bandwidth available for communications.

The design of wireless communication systems need to be flexible so that they can accommodate users and devices as technology, and the needs of users, change over time. However, improvements in the performance of the wireless communication systems should not operate to obsolete legacy equipment that may still serve the needs of a significant component of the users.

Thus, it is desirable to increase the information that can be communicated in a wireless communication system, but the increased ability to communicate information should not render legacy equipment obsolete.

BRIEF SUMMARY OF THE INVENTION

Methods and apparatus for controlling and communicating over a dynamically allocated embedded subfield are described. A system dynamically allocates an embedded subfield by consuming a portion of the information bandwidth occupied by a predetermined resource. The system limits the capacity of the predetermined resource in a manner that is backward compatible with legacy devices or with devices not configured to support the dynamically allocated embedded subfield.

In an embodiment, methods and apparatus for generating and using a shorthand connection identifier in an uplink map are described. A base station can communicate resource allocation to a wireless mobile station in an uplink map information element. The base station can identify destination mobile subscriber stations using a shorthand connection identifier. The base station parses the resource allocated to a standard connection identifier field into a shorthand connection identifier field and an embedded subfield.

The shorthand connection identifier field can be sized to support a predetermined number of mobile subscriber stations. The base station can further parse the embedded subfield field into a number of reduced sub-fields, each communicating a different set of control information. In one embodiment, the base station utilizes the embedded subfield to communicate power, timing, and frequency information to the destination mobile subscriber station.

Aspects of the invention include a method of dynamically allocating an embedded subfield. The method includes allocating a shorthand field having a shorthand field length that is less than a standard field length, allocating the embedded subfield to an unallocated portion of the standard field, and communicating information using the embedded subfield.

Aspects of the invention include a method of dynamically allocating an embedded subfield. The method includes assigning a shorthand CID to a subscriber station, the shorthand CID having a bit length less than a bit length of a standard CID, allocating the embedded subfield to the unassigned portion of the standard CID, and communicating information to the subscriber station in a standard CID field having the shorthand CID and the embedded subfield.

Aspects of the invention include a method of dynamically allocating an embedded subfield. The method includes monitoring a transmission from a subscriber station, determining a scheduled uplink resource allocation for the subscriber station, generating a control message for the subscriber station based on monitoring the transmission, generating an uplink map (UL-MAP) including the uplink resource allocation and the control message, the control message occupying an unallocated portion of a standard field occurring in the UL-MAP.

Aspects of the invention include a method of processing information in a dynamically allocated embedded subfield. The method includes receiving a message having a standard field in a predetermined message, extracting a shorthand field from a portion of the standard field, and extracting an embedded subfield information from a remaining portion of the standard field.

Aspects of the invention include a method of processing information in a dynamically allocated embedded subfield. The method includes exchanging communication capabilities with a base station, receiving a shorthand CID from the base station, the shorthand CID capable of representation in fewer bits than a standard CID, receiving an Uplink Map (UL-MAP) from the base station, determining the shorthand CID occurs in the UL-MAP, and extracting a message from an embedded subfield occurring in a portion of a standard CID field.

Aspects of the invention include an apparatus configured to communicate over a dynamically allocated embedded subfield that includes a scheduler configured to determine a scheduled resource allocation to a subscriber station, an embedded subfield message generator configured to generate an embedded subfield message to the subscriber station, a message generator coupled to the scheduler and the embedded subfield message generator and configured to generate a message directed to the subscriber station by concatenating the embedded subfield message to a shorthand CID identifying the subscriber station, and a transmitter coupled to the message generator and configured to transmit the message.

Aspects of the invention include an apparatus configured to process a dynamically allocated embedded subfield that includes a receiver configured to receive a downlink signal, a comparator coupled to the receiver and configured to determine whether a portion of the downlink signal is directed to a subscriber station identified by a shorthand CID occurring in a portion of a standard CID field of the portion of the downlink signal, and an embedded subfield processor coupled to the comparator and configured to extract an embedded subfield message from the downlink signal if the shorthand CID corresponds to a predetermined shorthand CID.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

Figure 1:
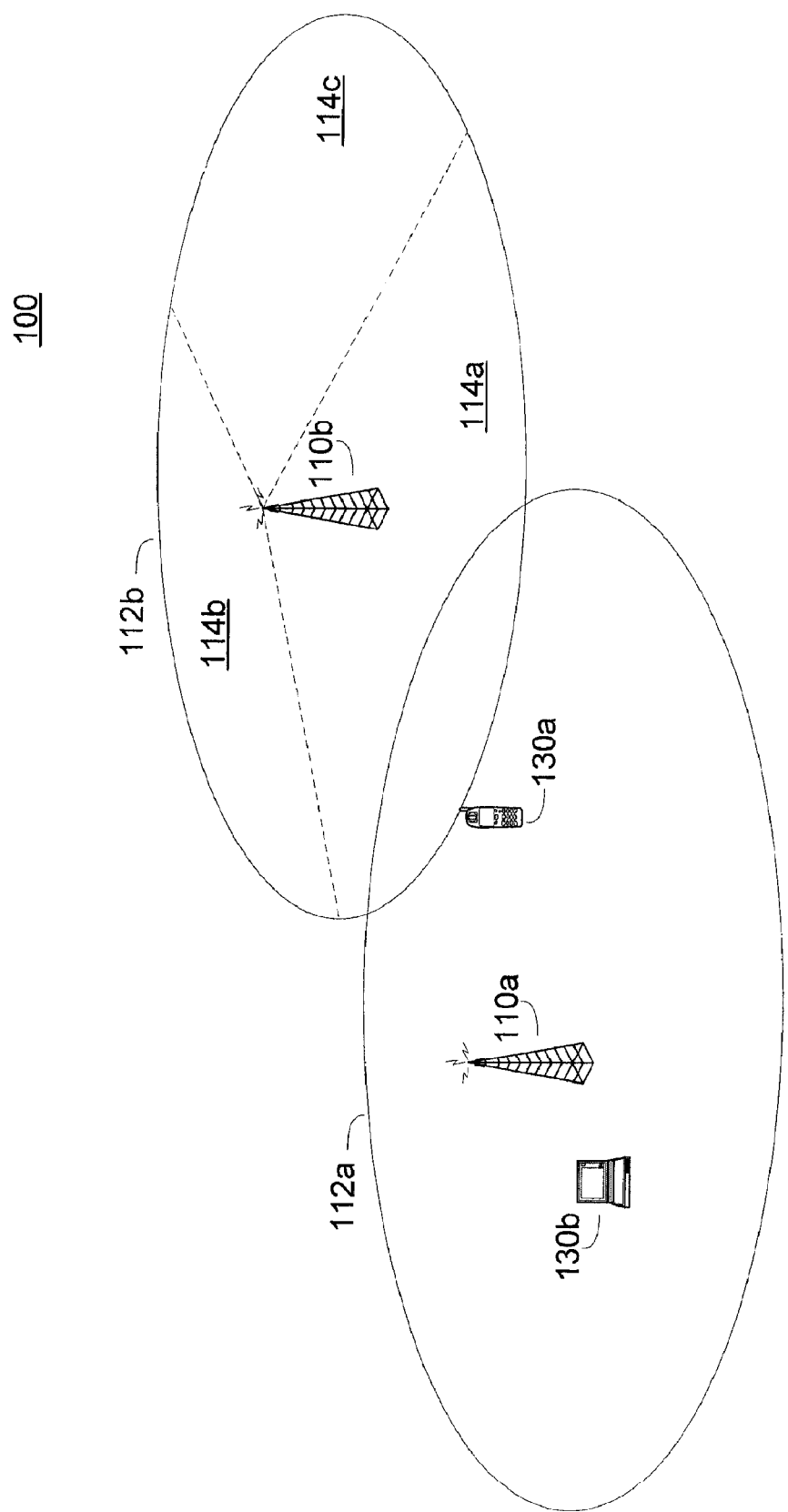
FIG. 1 is a simplified functional block diagram of an embodiment of a wireless communication system.

FIG. 1 is a simplified functional block diagram of an embodiment of a wireless communication system 100. The wireless communication system 100 includes a plurality of base stations 110*a*, 110*b*, each supporting a corresponding service or coverage area 112*a*, 112*b*. Each base station 110*a* and 110*b* can be coupled to a network (not shown) such as a wired network, and can be configured to allow wireless communication with devices on the wired network.

A base station, for example 110*a*, can communicate with wireless devices within its coverage area 112*a*. For example, the first base station 110*a* can wirelessly communicate with a first subscriber station 130*a* and a second subscriber station 130*b* within the coverage area 112*a*. In another example, the first subscriber station 130*a* can communicate with a remote device (not shown) via the first base station 110*a*. In another example, the first subscriber station 130*a* can communicate with the second subscriber station 130*b* via the first base station 110*a*.

The base stations, 110*a* and 110*b*, can be part of the same communication network or can be part of distinct communications networks. The base stations 110*a* and 110*b* can be in communication with each other, either through a direct communication link or via an intermediary network. Alternatively, where the base stations 110*a* and 110*b* are in distinct networks, a first base station 110*a* may have no knowledge regarding the operation of the second base station 110*b*.

There may be any number of base stations 110*a* and 110*b* within a wireless communication system 100, although FIG. 1 depicts only two base stations 110*a* and 110*b*. The base stations 110*a* and 110*b* alternatively can be referred to as access points or nodes.

Each of the base stations 110 and 110*b* can be configured to support an omni-directional coverage area or a sectored coverage area. For example, the second base station 110*b* is depicted as supporting a sectored coverage area 112*b*. The coverage area 112*b* is depicted as having three substantially equal sectors, 114*a*, 114*b*, and 114*c*. The second base station 110*b* treats each sector, for example 114*a*, as effectively a distinct coverage area. The number of sectors in each coverage area 112*a* and 112*b* is not a limitation on the operation of the dynamic embedded subfield described herein.

Although only two subscriber stations 130*a* and 130*b* are shown in the wireless communication system 100, the system can be configured to support virtually any number of subscriber stations. The subscriber stations 130*a* and 130*b* can be mobile stations or stationary stations. The subscriber stations 130*a* and 130*b* alternatively can be referred to, for example, as mobile stations, mobile units, or wireless terminals.

A mobile station can be, for example, a wireless handheld device, a vehicle mounted portable device, or a relocatable portable device. A mobile subscriber station can take the form of, for example, a handheld processor, a notebook computer, a wireless telephone, or some other type of mobile device.

In one example, the wireless communication system 100 is configured for Orthogonal Frequency Division Multiple Access (OFDMA) communications. For example, the wireless communication system 100 can be configured to be substantially in accordance with a standard system specification, such as IEEE 802.16 or some other wireless standard. The wireless communication system 100 can support the dynamically allocated embedded subfield described herein as an extension to the system standard or as part of a system standard.

The wireless communication system 100 is not limited to an OFDMA system, and the dynamically allocated embedded subfield described herein is not limited to application in OFDMA systems. The description is offered for the purposes of providing a particular example of the operation of a dynamically allocated embedded subfield in a wireless communication environment.

The base stations 110*a* and 110*b* are configured to transmit data packets to the subscriber stations 130*a* and 130*b* organized in frames using one or more slots. The term "downlink" is used to refer to the direction of communication from the base station, e.g. 110*a*, to a subscriber station, e.g. 130*a*. Each slot can include a predetermined number of OFDMA subcarriers, Orthogonal Frequency Division Multiplex (OFDM) symbols, or a combination of subcarriers and symbols. Each frame can span a multiple of symbols, and in a Time Division Duplex (TDD) system can span multiple symbols in a downlink period, a distinct multiple of symbols in an uplink period, as well as an overhead period that can include, for example, a preamble.

Each base station, for example 110*a*, can supervise and control the communications within its respective coverage area 112*a*. Each active subscriber station, for example 130*a*, registers with the base station 110*a* upon entry into the coverage area 112*a*. The subscriber station 130*a* can notify the base station 110*a* of its presence upon entry into the coverage area 112*a*, and the base station 110*a* can interrogate the subscriber station 130*a* to determine the capabilities of the subscriber station 130*a*.

The base station 110*a* assigns a temporary identifier to the subscriber station 130*a* for use identifying the subscriber station 130*a* to the base station 110*a*. The temporary identifier can be referred to as a Connection Identifier (CID). In a communication system operating in accordance with the IEEE 802.16 standard for OFDMA physical layer communications, a subscriber station 130*a*, a subscriber station 130*a* can be allocated a number of connection identifiers. For example, the base station 110*a* may allocate management and traffic connection identifiers to the subscriber station 130*a*. The base station 110*a* can allocate a Basic and a Primary CID to the subscriber station 130*a*, and may allocate traffic CID values as needed by the subscriber station 130*a*. The dynamic embedded subfield described herein can be based on the Basic CID value of an IEEE 802.16 OFDMA system. The system can allocate a predetermined range for the CID, and reserves a number of bits necessary to support the maximum CID value in each message requiring a CID value.

In a packet based wireless communication system 100, it may be advantageous for the system to allocate resources as needed, rather than maintaining an active channel assignment for each subscriber station 130*a* or 130*b* having an established communication session with a base station 110*a* or 110*b*. The base station 110*a* can allocate resources to the subscriber station 130*a* on an as needed basis. For example, in an OFDM system, the base station 110*a* can allocate time and frequency resources to each subscriber station 130a when the subscriber station 130a has information to send to the base station 110a.

The communication link from the subscriber station 130a to the base station 110a is typically referred to as the "uplink." The base station 110a can allocate uplink resources to the subscriber station 130a to avoid collisions that may occur if the subscriber stations 130a or 130b are allowed random access to the resources. The base station 110a can allocate the uplink resources in units of symbols and OFDMA subcarriers. Additionally, the base station 110a can specify a modulation format, an encoding rate, and the like, or some combination thereof in the resource allocation messages.

In one embodiment, the base station 110a is configured to allocate uplink resources to the subscriber station 130a in accordance with the IEEE 802.16 standard for OFDMA physical layer communications. The base station 110a sends an Uplink-Map (UL-MAP) in each frame, where a frame of information spans a predetermined time. In one embodiment, each frame time division multiplexes a predetermined downlink time portion and a predetermined uplink portion in a time division duplex (TDD) fashion. In other embodiments, the uplink and downlink time portions may occur during at least partially overlapping time assignments, but may be separated in frequency in a frequency division duplex (FDD) fashion.

The UL-MAP includes the CID of the subscriber station 130a to which the uplink resource is allocated, and the associated resource allocation. The IEEE 802.16 standard sets forth a 16-bit value for the CID, corresponding to approximately 64K possible subscriber stations that can be uniquely identified. It is unlikely that a base station 110a will need to support 64K unique users in its coverage area 112a. In fact, the trend in wireless communication systems 100 is to provide a greater distribution of base stations 110a and 110b, each having a smaller coverage area 112a and 112b, respectively.

The wireless communication system 100 can be configured to provide an extension to the standard in order to provide a dynamically allocatable embedded subfield. The wireless communication system 100 can allow the base stations 110a and 110b the ability to dynamically allocate an embedded subfield using a portion of the information bandwidth used to support the 16-bit CID value.

The base station can be configured to restrict the assigned CID values to a shorthand CID value that can be expressed in fewer than 16 bits. The bits that are not used to express the shorthand CID value can be used by the base station 110a as an embedded subfield over which additional information can be carried.

The embedded subfield carried in the modified CID field can be used to convey any type of information. The examples provided herein typically define the subfield as an embedded subfield having power, time, and frequency control bits. However, the embedded subfield is not limited to any particular number of bits, nor is the embedded subfield limited to carrying a particular type of information.

In one embodiment, the base station 110a assigns a CID to subscriber stations 130a in its coverage area 112a using values that can be expressed in 10 bits. The base station 110a can support 1K unique subscriber stations with this range of CID values. The base station 110a can use the remaining 6 bits that are normally associated with the CID as an embedded subfield.

The base station 110a can communicate information over the embedded subfield each time the base station 110a addresses a subscriber station 130a using a shorthand CID value. The base station 110a can use the embedded subfield to communicate virtually any type of information, and the information included in the embedded subfield does not need to be associated with the subscriber station having the shorthand CID value. However, it may be advantageous to associate the embedded subfield information with the subscriber station identified with the shorthand CID.

In an embodiment, the embedded subfield can be used to communicate control or overhead information to the subscriber station 130a having the associated shorthand CID. For example, the control information can be power, frequency, and time information used by control loops within the subscriber station 130a.

The use of the shorthand CID is backward compatible with legacy devices and with devices that do not have the capability to support the embedded subfield associated with the shorthand CID. The base station 110a can negotiate or otherwise determine the capabilities of the subscriber station 130a when the subscriber station 130a initially registers with the base station 110a and receives the CID assignment. The base station 110a can determine, at this time, whether the subscriber station 130a supports extension to the standard featuring the shorthand CID format.

If the base station 110a determines that the subscriber station 130a does not support the shorthand CID and associated embedded subfield, the base station 110a can still assign a unique CID value that can be represented by 10 bits. However, the base station 110a identifies the subscriber station 130a using the complete 16-bit CID field. The base station 110a can prepend leading zeros to the CID value to populate the 16-bit representation.

If, however, the base station 110a determines that the subscriber station 130a does support the shorthand CID extension to the standard, the base station 110a assigns a unique CID value that can be represented by 10 bits, but can use the upper 6 bits of the CID for the embedded subfield.

Provided the base station 110a assigns unique CID values within the range supported by the shorthand CID, the subscriber stations that do not support the shorthand CID format will not mistakenly interpret as its corresponding CID any combination of embedded subfield information and shorthand CID.

The description of the operation of the wireless communication system 100 focuses on the CID and the ability to dynamically allocate and communicate control information using a portion of resources normally allocated to support communication of the CID value. However, the dynamic allocation is not limited to operation in a CID field, and can generally be implemented in any communication system for which some bits may be dynamically reallocated as an embedded subfield. Additionally, the information carried over the embedded subfield is not limited to control information, but can be any type of information that is supported by the resources available in the embedded subfield.

The wireless communication system 100 can also have the ability to modify or otherwise dynamically select other parameters related to the downlink and uplink communication links. For example, each of the base stations 110a and 110b can determine a modulation type and encoding rate from a plurality of modulation types and encoding rates. The base stations 110a and 110b can be configured to select from a predetermined number of modulation types that can include Quadrature Phase Shift Keying (QPSK) and various dimensions of Quadrature Amplitude Modulation (QAM), such as 16-QAM and 64-QAM.

Each modulation type can have a limited number of available encoding rates. For example, QPSK modulation can be associated with rate ½ or rate ¾ encoding, 16-QAM can be associated with rate ½ or rate ¾ encoding, and 64-QAM can be associated with rate ½, rate ⅔, or rate ¾ encoding. Thus, a base station 110a, 110b can select a modulation type-encoding rate pair from a possible seven different types.

The base stations 110a and 110b can communicate the modulation type-encoder rate pair to a subscriber station 130a or 130b in an overhead message. In one embodiment, the overhead message can be a broadcast message that includes resource allocation information. For example, the overhead message can include the timing, modulation type-encoder rate pair, and slot information allocated to each of the subscriber stations 130a and 130b in the current frame or one or more subsequent frames. The base stations 110a and 110b can associate particular information with an identifier to allow the receiving subscriber stations 130a and 130b to determine which resources are allocated to them.

The base stations 110a and 110b can transmit the overhead message using a predetermined modulation type and encoder rate, such that the subscriber stations 130a and 130b know, a priori, how to process the overhead message. For example, the base stations 110a and 110b can transmit the overhead messages using the lowest data rate, that is, QPSK at rate ½.

These additional configurable features can be used to support the operation of the dynamically allocated embedded subfield. However, the use of the additional features is not a limitation on the operation of the dynamically allocated embedded subfield, and are described herein for the purposes of illustrating additional aspects that may be integrated with, or otherwise affect, the embedded subfield.

Figure 2:
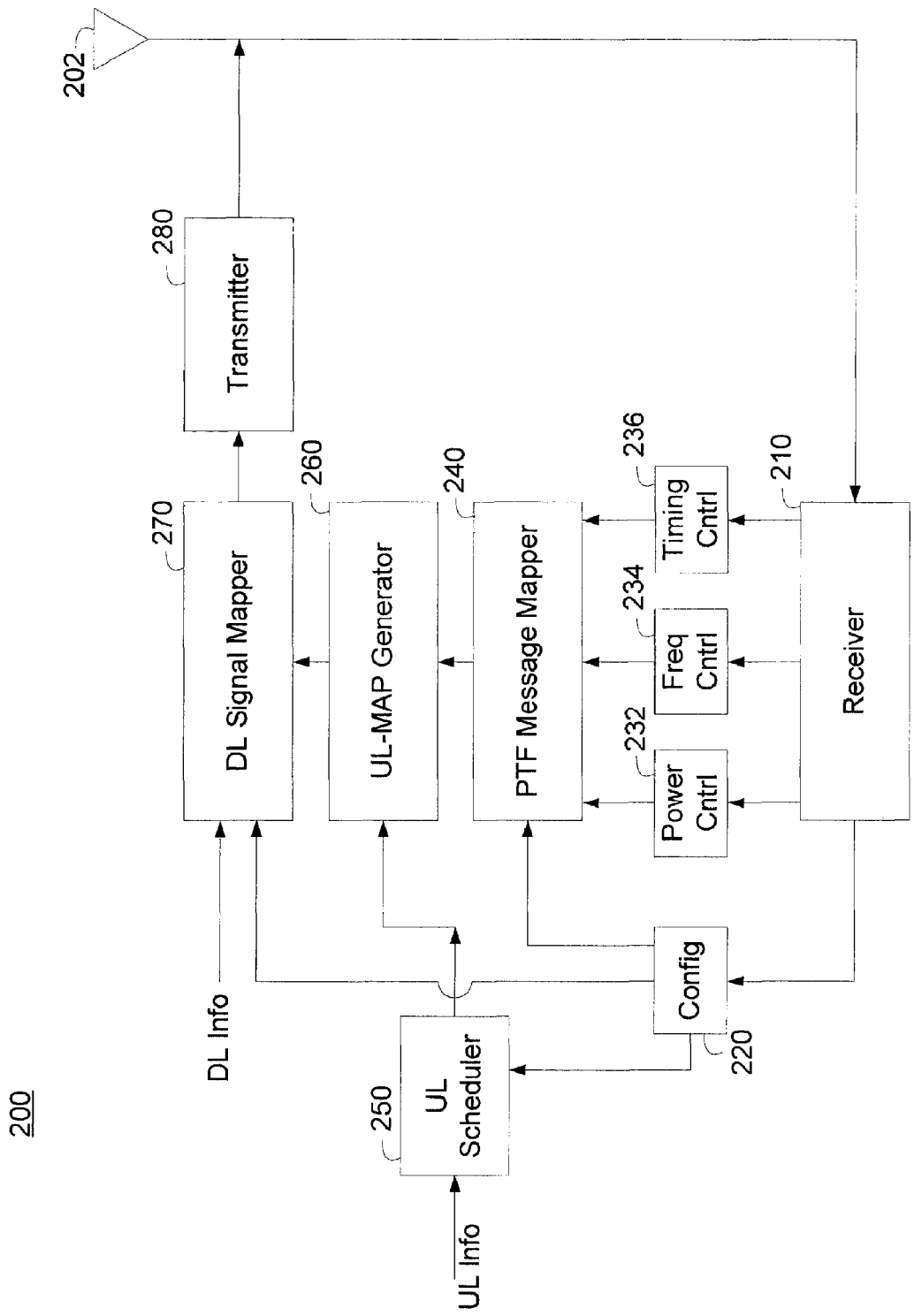
FIG. 2 is a simplified functional block diagram of an embodiment of a base station.

FIG. 2 is a simplified functional block diagram of an embodiment of a base station 200 configured to support the dynamically allocated embedded subfield. The base station 200 can be implemented in a wireless communication system, such as the wireless communication system of FIG. 1. Additionally, although FIG. 2 is described in the context of a base station 200, the features and aspects of the dynamically allocated embedded subfield can be implemented in transmitters of other communication systems and are not limited to those communication systems having base stations.

The base station 200 includes an antenna 202 configured to couple the downlink signal from the base station 200 to the various subscriber stations and to couple the uplink signals from the subscriber stations to the base station 200. The antenna 202 is coupled to a receiver 210 and a transmitter 280.

The receiver 210 operates to process the received wireless signals and convert them to a format that can be subsequently processed. The output from the receiver 210 can be routed to various modules for subsequent processing. The base station of FIG. 2 shows separate output signal connections to the various modules, but the separate output connections are used to illustrate the different data and information related to the various functional modules, and is not a limitation on the manner in which the receiver processes or distributes received information for subsequent analysis or processing.

The output of the receiver 210 is coupled to a configuration module 220, and a number of feedback control modules including a power control module 232, a frequency control module 234, and a timing control module 236. The configuration module 220 is coupled to an uplink (UL) scheduler 250 and an uplink map (UL-MAP) generator 260. The output of the UL scheduler 250 is also coupled to the UL-MAP generator 260.

The output from each of the feedback control modules is coupled to a Power/Time/Frequency (PTF) message mapper 240. The PTF message mapper 240 couples its output to the UL-MAP generator 260.

The UL-MAP generator 260 couples the UL-MAP information to a downlink (DL) signal mapper 270. The downlink signal mapper 270 couples the downlink signals to the transmitter 280, where the signals are processed to wireless signals that are transmitted using the antenna 202.

A subscriber station initially registers with the base station 200 upon entry into the coverage area supported by the base station 200. The base station 200 and registering subscriber station enter a capability negotiation phase.

In one embodiment, the receiver 210 receives a request from a subscriber station or otherwise determines that the subscriber station wishes to register with the base station 200. The receiver 210 couples the request to the configuration module 220 to initiate the capability negotiation phase. During the capability negotiation phase, the configuration module 220 can generate one or more queries that are communicated to the subscriber station that are used to determine the capabilities of the subscriber station. In one embodiment, the configuration module 220 generates a query requesting the capabilities of the subscriber station to support the shorthand CID embedded subfield. The query may directly address the capability of the subscriber station to support the shorthand CID embedded subfield, or may be an indirect query, such as a query of the model number and version of a baseband chip, chipset, or software used in the subscriber station.

The subscriber station responds to the query in a manner that allows the configuration module 220 to determine the capabilities of the subscriber station. If the subscriber station supports the shorthand CID, the configuration module 220 assigns a unique shorthand CID within the range supported by the shorthand CID, for example 10 bits, and generates a CID assignment message that is transmitted to the subscriber station. The configuration module 220 can also set a flag, store an indicator, or otherwise record the ability of the subscriber station to support the shorthand CID.

Alternatively, if the configuration module 220 determines that the subscriber station does not support the shorthand CID, the configuration module 220 assigns a CID to the subscriber station that can be represented by the number of bits in the shorthand CID, for example 10 bits, but addresses the subscriber station using the full CID field having a length of 16 bits. The configuration module 220 generates a CID assignment message that is transmitted to the subscriber station. The configuration module 220 also records the inability of the subscriber station to support the shorthand CID. Subsequent transmissions to the subscriber station that identify the subscriber station by the CID use the full standard field allocated to the CID, and do not attempt to transmit any information across the dynamically allocatable embedded subfield. The effect is that the CID field assigned to subscriber stations not supporting the dynamic embedded subfield will contain leading zeros for the number of bits corresponding to the bits that could have been used to support the embedded subfield.

As an example, the standard field for the CID is 16 bits, but a shorthand CID can use 10 bits, with the remaining 6 bits selectively allocated to an embodiment subfield. If the subscriber station has the capability to support the shorthand CID, the configuration module 220 assigns a 10-bit CID and the base station 200 can allocate the remaining 6 bits for the embedded subfield. Alternatively, if the subscriber station is not capable of supporting the shorthand CID, the configuration module assigns a CID that can be represented in 10 bits, but messages addressed to the non-enabled subscriber station use the full 16-bit CID field. Thus, in one embodiment, the upper 6 bits will all be zeros. The configuration module 220 assigns all CID values within the 10-bit range, such that there is no possibility of a collision caused by a combination of embedded subfield information and shorthand CID coinciding with an assigned standard field CID.

In some embodiments, the base station 200 may support one of a plurality of shorthand CID formats. The base station 200 may communicate the particular format to the subscriber stations in its coverage area. The base station 200 can communicate the shorthand CID format to the subscriber station in a dedicated message or a broadcast message. For example, the base station 200 can communicate the shorthand CID format in a downlink broadcast message.

The base station 200 can communicate the format of the shorthand CID in any of a variety of ways. The base station 200 can communicate the size of the shorthand CID field, the format of the remaining control channel bits, and the manner in which the control channel bits convey information. In the example described earlier, the base station 200 can communicate a 10-bit shorthand CID field length, a control channel having three 2-bit control fields corresponding to power, time, and frequency, and a format for the control bits. For example, each 2-bit control field can indicate a polarity and a magnitude of an error or correction.

The base station 200 can communicate each of the parameters independently, or may communicate an indicator of a particular format from a predetermined plurality of formats. For example, a base station 200 may support any one of K distinct shorthand CID formats, and the base station 200 indicates the format by communicating an index identifying the particular format supported by the base station 200. A first format can correspond to the example described above, where a 16-bit CID field includes a 10-bit shorthand CID field appended to a 6-bit embedded subfield. The 6-bit subfield can be formatted as having 2-bits dedicated to each of power, time, and frequency. A second format may allocate 10 bits to the shorthand CID and the remaining 6 bits to a control channel used to deliver power control information. Similarly, in other formats, the control channel may be dedicated to timing information or frequency information.

Once communications have been established between the base station 200 and the subscriber station, the receiver 210 monitors parameters of the uplink signal from the subscriber station. In one embodiment, the base station 200 monitors several uplink signal parameters and provides control information back to the originating subscriber station to provide closed loop control of the signal parameters. In the embodiment of FIG. 2, the base station 200 monitors the uplink received power, the uplink frequency, and the uplink message timing.

The subscriber stations typically have some ability to modify the transmit power, and each subscriber station can control its transmit power, in part, based on a closed loop power control operation that uses control information received from the base station 200. A power control module 232 monitors the received signal power of the uplink signal. A received power that is too low increases the error rate in the received signals. Conversely, excess received power can reduce the error rate associated with the signal from the transmitting subscriber station, but may cause receiver saturation, which can reintroduce errors. However, the transmission from one subscriber station can contribute to the uplink interference level experienced by all other subscriber stations. Additionally, each subscriber station may wish to reduce its transmit power, while maintaining an acceptable error rate, in order to conserve power. Conserving power in the subscriber station allows the subscriber station to provide extended battery life.

The subscriber station controls the transmit power in a closed loop operation in order to compensate for the changes in channel conditions that can be attributable to changes in distance and changes in fading environments that are particularly experienced by mobile subscriber stations. The power control module 232 monitors the received signal, and can monitor the received signal strength, and can generate a feedback control signal. The power control module can couple the feedback control signal to the PTF message mapper 240 for mapping to a control channel message.

The frequency control module 234 monitors the frequency of the received signal. The received signal can vary or otherwise differ from the desired or ideal received frequency for a variety of reasons. For example, in a mobile subscriber station, Doppler effects can cause a frequency shift in the received signal. Additionally, the frequency synthesizer or Local Oscillator (LO) in the subscriber station may introduce some error. The frequency control module 234 can monitor the frequency of the received signal corresponding to the subscriber station, and can generate a frequency feedback control signal for transmission to the subscriber station. The frequency control module 234 couples the frequency feedback control signal to the PTF message mapper 240 for mapping to a control channel message.

Similarly, the timing control module 236 monitors the timing of the received signals transmitted by the subscriber station. In a packet based communication system, the uplink transmission may be discontinuous, and may be scheduled according to a schedule. Additionally, in a Time Division Multiplex (TDM) communication system, the communications can be allocated to a specific time slot, and the subscriber station needs to maintain the timing necessary to support the time allocations. For example, in a wireless communication system in accordance with IEEE 802.16, the base station may allocate specific OFDMA subcarriers at specific times to support uplink communications from the subscriber station. Communications with the subscriber station as well as communications from other subscriber stations may be degraded if the subscriber station does not or is unable to maintain the proper time synchronization with the system.

Moreover, because the subscriber station time allocation may be based on timing at the reference point of the antenna 202 of the base station 200, the subscriber station needs to advance its uplink transmission to compensate for the propagation delay from the subscriber station to the base station 200. The timing control module 236 monitors the received signals from the subscriber station to determine the timing errors. The timing control module 236 generates a feedback control signal that is indicative of the timing error. The timing control module 236 couples the feedback control signal to the PTF message mapper 240 for mapping to a control channel message.

The PTF message mapper 240 can be configured to generate at least one control message format that can be transmitted back to the subscriber station to provide feedback of the monitored parameters, and can typically generate control messages according to a plurality of formats. In one embodiment, the PTF message mapper 240 generates a PTF control message that can be mapped to the embedded subfield associated with the shorthand CID. For example, where the embedded subfield is composed of 6 bits allocated from the standard field of the CID, the PTF message mapper 240 can generate a control message based on the feedback signals from each of the power control module 232, the frequency control module 234, and the timing control module 236. The PTF message mapper 240 may support a control message format that allocates 2-bits to each of the power, time, and frequency control feedback. Of course the embedded subfield is not limited to 6 bits, nor is each of the control messages feedback components limited to only 2 bits. The PTF message mapper 240 can map the feedback control message to the upper 6 bits of a shorthand CID that occurs as part of an UL-MAP message.

However, the subscriber stations, and their respective CID values, do not necessarily occur in UL-MAP messages according to a periodic schedule. Moreover, not every subscriber station is capable of supporting the embedded subfield associated with the shorthand CID. The base station 200 monitors the UL-MAP message and the identities and capabilities of the subscriber stations scheduled to be included in the UL-MAP to support the embedded subfield.

The base station 200 includes a UL scheduler 250 that determines when each of the subscriber stations are to be allocated UL resources. The UL scheduler 250 can schedule UL resources based in part on the needs of the subscriber stations. Some subscriber stations may be engaged in low data rate communications, such as voice communications, that do not need to be scheduled every frame. Some other subscriber stations maybe engaged in higher data rate communications, such as real time video transfer that require greater bandwidth and have latency constraints. The UL scheduler 250 can schedule the various subscriber stations to satisfy the UL communications, while enforcing some level of fairness.

The UL-MAP generator 260 receives the schedule information from the UL scheduler 250 and generates a UL-MAP that is transmitted to the subscriber stations. The UL-MAP is a message that includes the various UL resource allocations. The UL-MAP is broadcast across the coverage area on a control channel that is part of the DL signals. For example, the base station 200 can transmit the UL-MAP in each frame, indicating the UL resource assignments for the next frame.

The UL-MAP generator 260 generates the UL-MAP in accordance with the system standard, for example, IEEE 802.16. However, the UL-MAP generator 260 can be configured to support extensions to the standard, and can be configured to support the embedded subfield associated with a shorthand CID.

The UL-MAP generator 260 examines the capabilities of the subscriber modules, based on the information provided or otherwise determined by the configuration module 220. For each subscriber station that is scheduled to receive UL resources, the UL-MAP generator 260 determines whether the subscriber station is capable of supporting the embedded subfield. If the subscriber station supports the embedded subfield, the UL-MAP generator 260 generates the UL-MAP and includes a PTF control message from the PTF message mapper 240 with the shorthand CID. As will be described in further detail below, the PTF control message can be the PTF message corresponding to the subscriber station having the shorthand CID with which the PTF control message is coupled or may be a PTF control message associated with some other subscriber station. If the subscriber station does not support the embedded subfield, the UL-MAP generator 260 does not include a PTF control message with the CID, and instead, identifies the subscriber station with the full standard field.

The UL-MAP generator 260 couples the UL-MAP to the DL signal mapper 270. The DL signal mapper 270 maps the UL-MAP to the appropriate resources in the DL signal and the transmitter 280 processes the DL signal for transmission to the subscriber stations.

Figure 3:
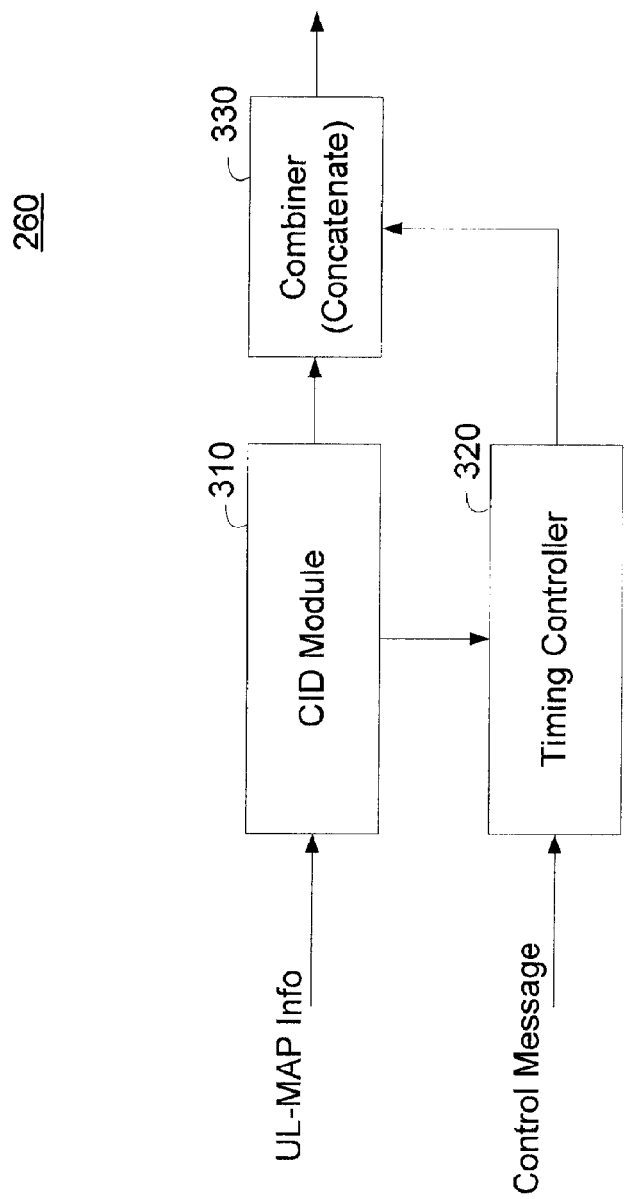
FIG. 3 is a simplified functional block diagram of an embodiment of an Uplink Map generator.

FIG. 3 is a simplified functional block diagram of an embodiment of a UL-MAP generator 260. The UL-MAP generator 260 shown in FIG. 3 is an example of a UL-MAP generator 260 that can be implemented in the base station of FIG. 2.

The UL-MAP generator 260 includes a CID module 310 that is coupled to a first input of a combiner 330. A timing controller 320 is configured to receive the control message for the embedded subfield, for example, from a PTF message mapper, and has an output coupled to a second input of the combiner 330. The output of the combiner 330 is the UL-MAP message.

The CID module 310 is configured to receive the UL-MAP information, including the various subscriber CID information and any Information Elements (IE) associated with the CIDs. The CID module 310 is configured to examine the CID and determine if the CID corresponds to an embedded subfield enabled subscriber station. In one embodiment, the CID module 310 examines one or more flags, settings, or memory locations in a configuration module (not shown) that indicate the subscriber station capabilities. In another embodiment, the CID module 310 includes a look up table of assigned subscriber station CID values and the associated capabilities.

If the subscriber station does not have the capabilities to support the embedded subfield, the CID module 310 controls the timing controller 320 to inhibit the coupling of the PTF control message to the combiner 330. If the subscriber station supports the embedded subfield, the CID module 310 enables the timing controller 320, and the timing controller 320 couples the PTF control message to the combiner 330 and controls the entry of the PTF control message at the appropriate time.

The combiner 330 operates to selectively combine the PTF control message with the shorthand CID to populate a standard field size. In one embodiment, the timing controller 320 couples the PTF control message to the combiner 330 and the combiner 330 operates to prepend the control message to the shorthand CID. In another embodiment, the CID module 310 provides the UL-MAP to the combiner using a 16-bit format for all CID values, even those supporting the shorthand CID. The combiner 330 operates to overwrite those bits in the UL-MAP corresponding to the embedded subfield. In the embodiment described above, the combiner 330 operates to overwrite the upper 6 bits of the standard CID field with the PTF control message.

The manner in which the standard CID field is modified is not limited to having the lower bits allocated to the shorthand CID value. For instance, the upper 10 bits could be used for the shorthand CID with the embedded subfield appended or over written as the lower 6 bits. The shorthand CID need not be represented in contiguous bits. In fact, any k bits out of the original set of bits in the standard CID field yields $2^k-1$ unique shorthand CIDs, with the remaining bits available for use as an embedded subfield. As an example, an embodiment may allocate the most significant bit and the nine least significant bits of a 16-bit CID field for a shorthand CID. The remaining six contiguous bits may be used as an embedded subfield or to communicate some other relatively low bandwidth information. This shorthand CID configuration allows a base station to allocate CID values for legacy devices in both the upper half of the full 16-bit field as well as in the lower half of the full 16-bit field.

The base station can support one or a plurality of embedded subfield message types and message formats. In addition to selecting a particular message type, the base station may select a message format if the base station supports a plurality of message formats. As an example, a PTF message format supplies PTF control information in a UL-MAP of a frame, frame N. The UL-MAP can be configured to provide the resource allocation applicable for frame N+1. In such an embodiment, the time relevance of the UL resource allocation is referred to as N+1. If the PTF message applies to the same subscriber station whose shorthand CID it is appended, the time relevance of the PTF message can be either N or N+1. In other embodiments, the time relevance of the UL-MAP can be N or some other time relevance. The implementation of the embedded subfield is not limited to any particular time relevance. The time relevance of control information in the embedded subfield can have the same time relevance or different time relevance relative to the field in which it is embedded.

The wireless communication system of the base station can select a control message time relevance of N+1. This configuration may be advantageous because it simplifies the tracking and distribution of the PTF control message. The PTF message can be prepended to the shorthand CID for which the PTF information applies. The subscriber station can extract the PTF message when it extracts the UL resource allocation and can apply the PTF corrections for use with the uplink communication in the N+1 frame. The subscriber station receives a PTF message within approximately one frame of the UL transmission time.

Although the timing between frames is relatively short, the latency in providing the PTF message in frame N for application in frame N+1 is not as ideal as providing the PTF message with an immediate relevance, referred to as a relevance of N. The base station may prepend the PTF message to the shorthand CID of the subscriber station for which the PTF information applies, but the relevance can be N. In such an embodiment, the subscriber station extracts the PTF message from the embedded subfield and processes the changes for use in the uplink transmission during frame N.

In situations where the subscriber station is allocated uplink resources for a large number of successive frames, this embodiment provides for improved time relevance. However, the subscriber station may not transmit in every frame, and may not receive an UL-MAP having a resource allocation in every frame. The UL resource allocation has a time relevance of N+1. Thus, a subscriber station may not receive a UL resource allocation in frame N+1. Thus, during frame N+1, the subscriber station may not receive any PTF message. For subscriber stations having sparse UL resource allocations, the time between the most recently received PTF message and the UL transmit frame may be much greater than 1 frame.

The base station may implement another embodiment that incorporates indirect identification of the relevant PTF message. In the embodiments described above, the PTF message for a particular subscriber station is appended to the shorthand CID for that subscriber station. In indirect identification, the subscriber station determines the position of the relevant PTF message through some indirect manner.

In one embodiment, the relevant PTF message is identified based on the position of the subscriber station's shorthand CID in the UL-MAP. When the subscriber station receives a resource allocation in a UL-MAP, the subscriber station determines the position of its shorthand CID. For example, a subscriber station may determine that it's shorthand CID is the third CID appearing in the UL-MAP. The subscriber station then examines the shorthand CID in the UL-MAP of the N+1 frame to extract the PTF message. That is, the relevant PTF message is the one in the N+1 frame appended to the CID appearing in the same position that the shorthand CID for the subscriber station in the UL-MAP for frame N. The subscriber station extracts the PTF message in frame N+1 and applies it to the transmission during frame N+1 allocated in the frame N UL-MAP.

If there is a mix of supporting and non-supporting subscriber stations allocated during the UL-MAP of frame N+1, the base station schedules a subscriber station that supports the embedded subfield in the same position used to allocate UL resources in frame N such that the PTF message can be appended to a shorthand CID. In the case where there are insufficient supporting subscriber stations allocated in the UL-MAP of frame N+1, the base station may need to append the PTF message to a dummy shorthand CID.

Figure 8A:
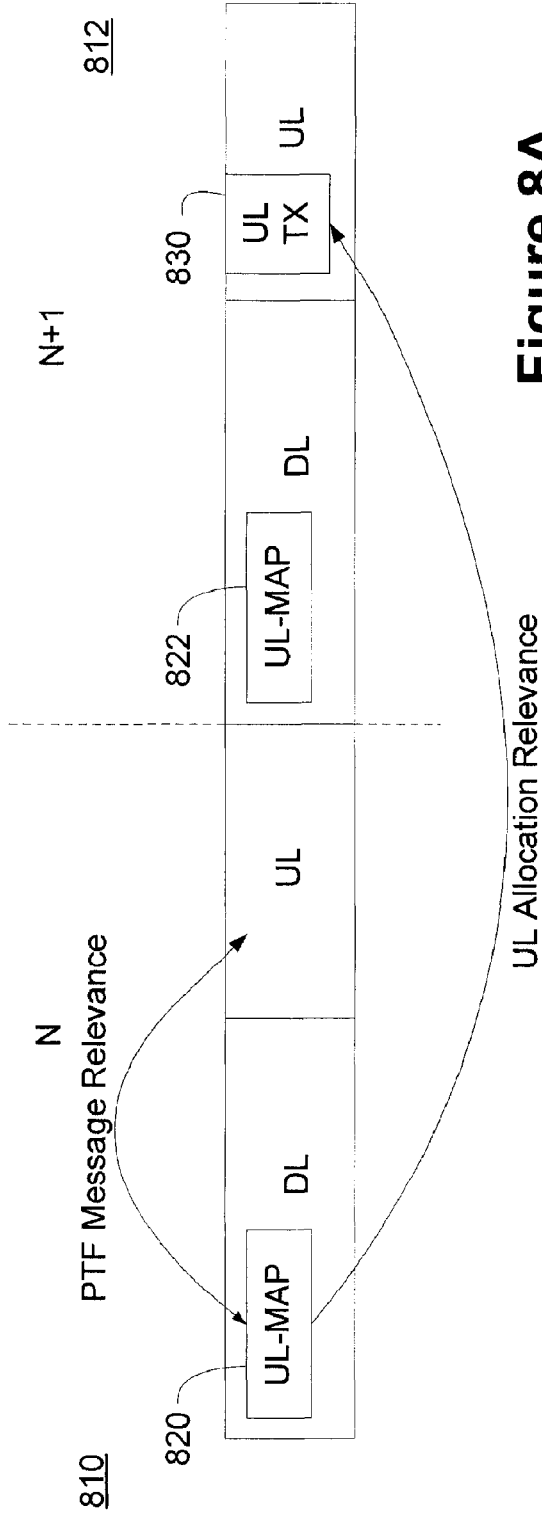
FIGS. 8A-8B are simplified timing diagrams of embodiments of embedded subfield time relevance.
Figure 8B:
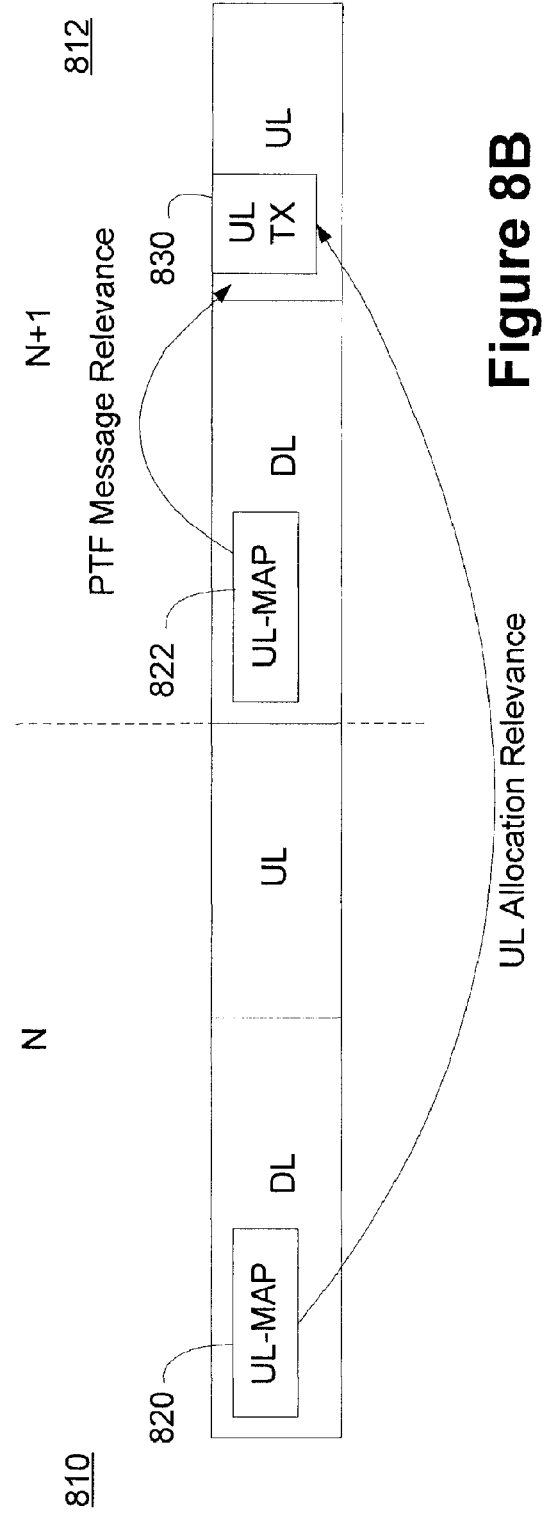

FIGS. 8A-8B are simplified timing diagrams illustrating different embodiments of embedded subfield time relevance. FIGS. 8A and 8B illustrate simplified timing diagrams of two separate embodiments of embedded subfields having relevance of N, although achieved in distinct manners.

FIG. 8A illustrates a simplified timing diagram of two sequential frames, 810 and 812. In the first frame 810, having an index of N, a subscriber station receives an UL-MAP 820 in frame N having a shorthand CID identifying the subscriber station. The subscriber station also receives control information with the shorthand CID via the embedded subfield. The embedded subfield information has a relevance of N. However, the uplink allocation 830 has a relevance of N+1. Thus, the UL allocation 830 received by the subscriber station in frame N is for uplink resources in frame N+1.

The subscriber station may not have an uplink allocation for frame N. The control information received in the embedded subfield of the shorthand CID in the UL-MAP 820 of frame N is not applied to uplink resources in frame N if the subscriber station did not previously receive an uplink allocation in the previous frame.

The UL-MAP 822 in frame N+1 may not allocate any uplink resources to the subscriber station. No control information is communicated to the subscriber station in frame N+1 because the subscriber station has no uplink allocation for frame N+2 (not shown). The subscriber station can use the most recent control information, received in frame N when transmitting in the uplink allocation 830 received in frame N. In this embodiment, the control information arrives one frame prior to the uplink allocation 830.

FIG. 8B illustrates a simplified timing diagram of two sequential frames, 810 and 812. A subscriber station receives an UL-MAP 820 in frame N 810 having a shorthand CID identifying the subscriber station. However, unlike the embodiment illustrated in FIG. 8A, the subscriber station does not necessarily receive relevant control information with the shorthand CID that identifies the subscriber station.

Instead, the base station communicates the control information relevant for the subscriber station UL allocation 830 in the UL-MAP 822 of frame N+1. In one embodiment, the base station includes the control information for the subscriber station along with the shorthand CID in the UL-MAP 822 of frame N+1 having the same index as the index of the shorthand CID identifying the subscriber station in the UL-MAP of frame N. If the shorthand CID identifying the subscriber station appears as the $j^{th}$ CID of the UL-MAP 820 in frame N, the relevant control information is associated with the $j^{th}$ CID of the UL-MAP 822 in frame N+1.

In this manner, the subscriber station can locate the relevant control information and apply it in the same frame as the UL allocation. Thus, the subscriber station receives control information in the UL-MAP 822 of frame N+1, at a known index, and can apply the control information during the UL allocation 830 of frame N+1. In this embodiment, the subscriber station receives the control information in the same frame in which it is applied.

The base station may encounter special conditions where fewer subscriber stations receive uplink allocations in frame N+1 or where some subscriber stations receiving uplink allocations in the UL-MAP 822 of frame N+1 do not support shorthand CID format. The base station can handle each of the special situations. For example, the base station can align the indices of the CID fields in the UL-MAPs, 820 and 822, to avoid the situation in which a CID not supporting shorthand CID aligns with an index of a prior uplink allocation to a subscriber station using shorthand CID. The base station may generate one or more dummy shorthand CID values, not corresponding to any subscriber station, if the number of actual shorthand CID fields in the UL-MAP 822 of frame N+1 are fewer than the number of subscriber stations with a shorthand CID allocated in frame N. That is, the base station may need to generate dummy shorthand CID values in the UL-MAP 822 of frame N+1 in order to communicate the control information to the subscriber stations allocated in the UL-MAP 820 of frame N.

Figure 4:
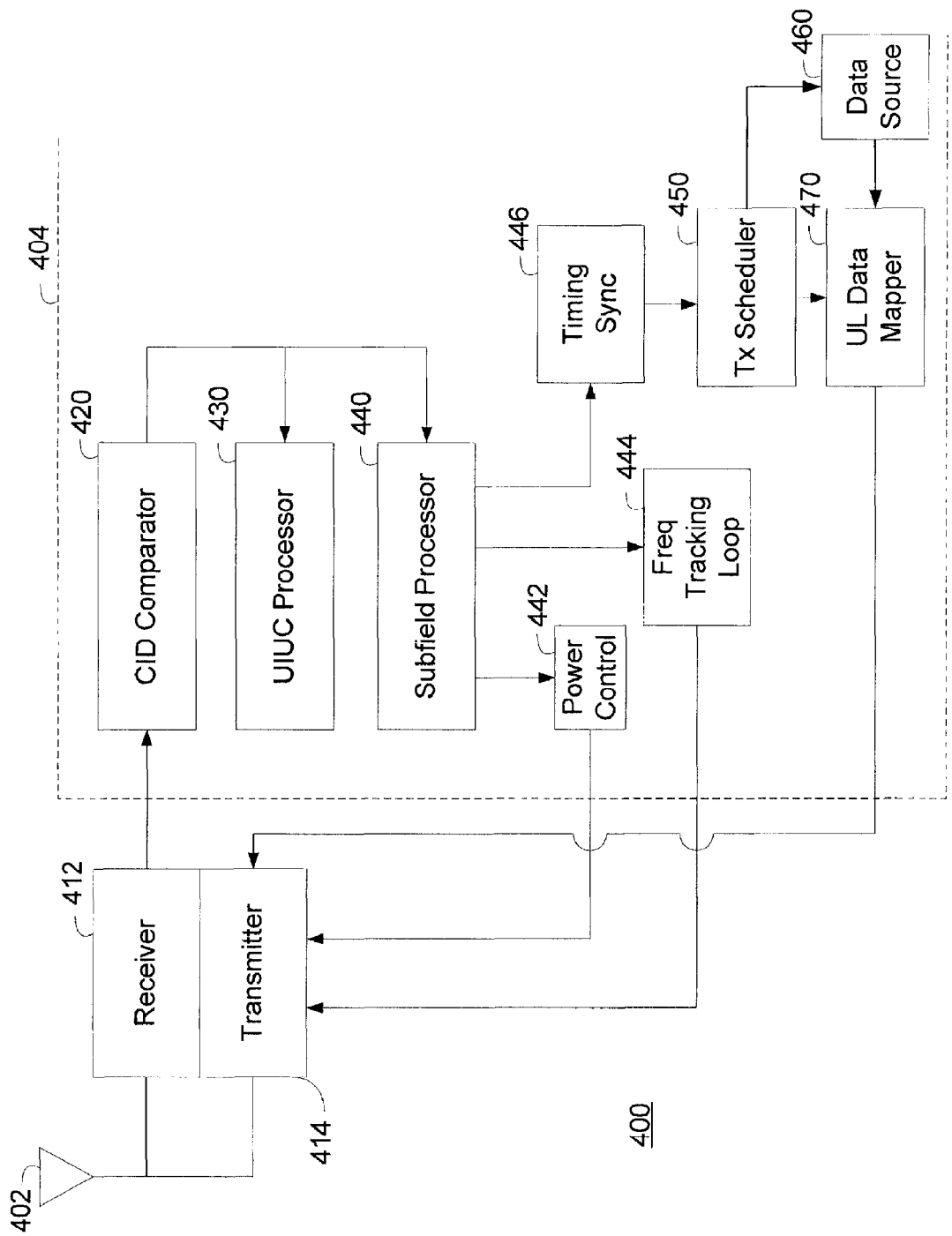
FIG. 4 is a simplified functional block diagram of an embodiment of a subscriber station configured to support an embedded subfield.

FIG. 4 is a simplified functional block diagram of an embodiment of a subscriber station 400 configured to support an embedded subfield, and more particularly, an embedded subfield allocated in a portion of the standard field of a CID. The subscriber station 400 can be, for example, the subscriber station shown in the wireless communication system of FIG. 1 and can process the embedded subfield messages generated by the base station of FIG. 2.

The subscriber station 400 includes an antenna 402 configured to couple the downlink wireless signals to a receiver 412 and couple the uplink signals from a transmitter 414 to a wireless channel. The receiver 412 and transmitter 414 are coupled to a baseband processor 404.

The receiver 412 is configured to receive the wireless signal and process the wireless signal to output, for example, a baseband signal that is coupled to the baseband processor 404. In one embodiment, the receiver 412 is configured to process a received OFDM signal and output baseband OFDM symbols.

The baseband processor 404 is configured to extract the various channels carried in the OFDM symbols and process the channels. The baseband processor 404 is configured to extract the UL-MAP information carried on the OFDM symbols, and process the UL-MAP to determine whether the subscriber station 400 is allocated uplink resources in the next frame. Although the baseband processor 404 typically performs functions in addition to those described in relation to FIG. 4, the functional block diagram is largely simplified to focus on the processing of the embedded subfield.

The baseband processor 404 includes a CID comparator 420 that is configured to extract the CID values from the UL-MAP and determine if the CID value coincides with the CID value assigned to the subscriber station 400. If an embedded subfield enabled subscriber station 400, such as the one illustrated in FIG. 4, determines from the capability negotiation phase that the base station also supports the embedded subfield, the CID comparator 420 processes the CID values in the UL-MAP according to the shorthand CID format. Alternatively, if the base station does not support the embedded subfield, the CID comparator 420 processes the CID values in the UL-MAP according to the standard field, which is 16 bits in length for an IEEE 802.16 compliant UL-MAP message. The subscriber station 400 does not perform any embedded subfield specific processing if the base station does not support the extension to the standard.

Assuming the originating base station supports the embedded subfield, the CID comparator 420 parses the UL-MAP and compares each shorthand CID in the UL-MAP to the assigned shorthand CID. The CID comparator 420 can store the assigned shorthand CID in memory (not shown) and extract the CID for comparison with the CID values in the UL-MAP.

If the CID comparator 420 determines that the UL-MAP addresses the subscriber station 400, the CID comparator 420 extracts or otherwise couples the associated UL resource allocation to the Uplink Interval Usage Code (UIUC) module 430. The CID comparator 420 can be configured to ignore any resource allocations not directed to the subscriber station 400.

The CID comparator 420 can also be configured to extract any PTF message from a desired embedded subfield. As described above, the PTF message for the subscriber station 400 can occur in an embedded subfield that is positioned adjacent the shorthand CID identifying the subscriber station 400. Alternatively, the PTF message for the subscriber station 400 can be adjacent some other shorthand CID value. In the latter case, the CID comparator 420 may determine the location of the PTF message based on the position of the shorthand CID identifying the subscriber station 400 in the UL-MAP from the previous frame.

The CID comparator 420 couples the appropriate PTF message to the embedded subfield processor 440. In another embodiment, the embedded subfield processor 440 processes the UL-MAP and extracts the relevant control message once the CID comparator indicates the shorthand CID of the subscriber station 400 is included in the UL-MAP. Therefore, the subscriber station 400 can extract and process PTF control information each time the UL-MAP includes the shorthand CID corresponding to the subscriber station 400.

The embedded subfield processor 440 extracts the various control information from the fields in the control message and couples the control information to the appropriate module within the subscriber station 400. For example, where the control message is a 6-bit PTF control message, the embedded subfield processor can extract each of the 2-bit power feedback, time feedback, and frequency feedback messages and can couple the messages to the corresponding modules.

The embedded subfield processor 440 can couple the power feedback information to a power control module 442, which can be, for example, an Automatic Gain Control (AGC) module. In one embodiment, the power control module 442 controls the gain of the transmitter 414 based on the power feedback information. In another embodiment, the power control module 442 controls a baseband gain in the uplink data source 460 to increase or decrease the power transmitted by the subscriber station 400. The power feedback information can inform the power control module 442 whether the gain is too high or too low, and can provide some information regarding the level of change to make. Of course, two bits of feedback information do not convey very much information, and other embedded subfield embodiments may allocate additional bits for the power feedback information.

The embedded subfield processor 440 provides the frequency feedback information to a frequency tracking loop 444, and the frequency tracking loop can vary an output frequency of the transmitter 414 based on the feedback information. In one embodiment, the frequency tracking loop varies a reference frequency in a frequency conversion stage of the transmitter 414. For example, the frequency tracking loop can vary a control voltage applied to a control input of a VCTCXO used as a frequency reference in the transmitter 414.

The embedded subfield processor 440 provides the timing feedback information to a timing and synchronization module 446. The timing and synchronization module 446 uses the timing feedback information to delay or advance the UL transmissions, such that they arrive at the base station at the scheduled time. The timing and synchronization module 446 couples the advance or delay information to the transmit scheduler 450 that is configured to schedule the transmission of the information from the UL data source 460.

The UL data source 460 can be configured to receive information from any of a variety of sources, including sources within the subscriber station 400 as well as sources external to the subscriber station 400. The UL data source 460 utilizes control and timing information from the timing and synchronization module 446 to determine the appropriate time to couple data and information to a UL data mapper 470. The UL data mapper 470 processes the information to format the information for inclusion in various channels, subcarriers, or other resources available on the UL. The UL data mapper 470 can be configured, for example, to generate the OFDM symbols transmitted by the subscriber station 400 over the uplink.

Figure 5:
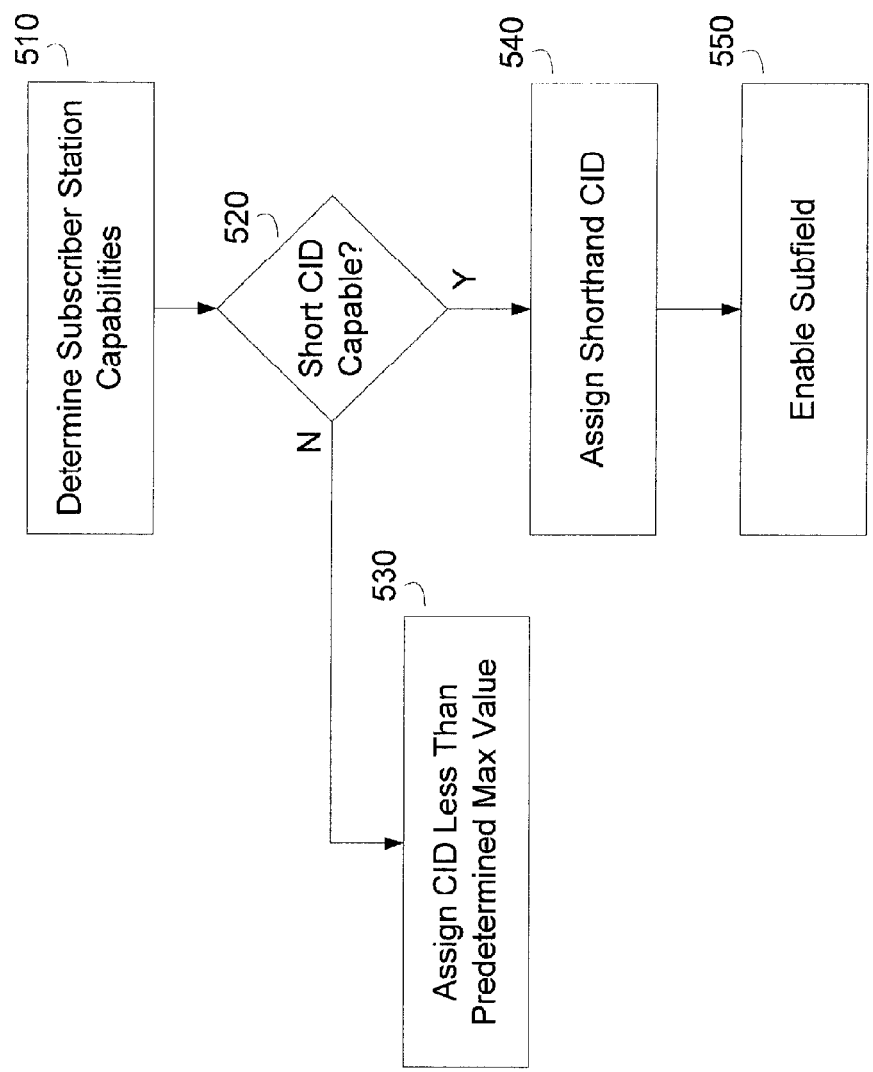
FIG. 5 is a simplified flowchart of an embodiment of a method of configuring an embedded subfield.

FIG. 5 is a simplified flowchart of an embodiment of a method 500 of configuring an embedded subfield. The method 500 can be performed, for example, by a base station of FIG. 1 or FIG. 2 to communicate embedded subfield information to an enabled subscriber station.

The method 500 begins at block 510 when the base station communicates with the subscriber station to determine the subscriber station capabilities. In particular, the base station interrogates the subscriber station with respect to the ability to support the embedded subfield. In one embodiment, the base station negotiates the capabilities of both the base station and the subscriber station during a capability negotiation phase that occurs when the subscriber station initially registers with the base station.

In one embodiment, the base station can determine the manufacturer, model, version, and the like, or some combination thereof of the hardware and software that supports the communication system. The base station can indirectly determine the capabilities of the subscriber station based on this information.

The base station proceeds to decision block 520 and determines whether the subscriber station supports short CID and the associated embedded subfield as part of its capabilities. If not, the base station proceeds to block 530 and assigns to the base station a CID value that is less than a predetermined maximum value. The predetermined maximum value can be a value that can be represented in fewer than the number of bits allocated to the standard field. For example, the standard field for the CID is allocated 16 bits in the standard. The predetermined maximum should be able to be represented in fewer than 16 bits. In the previous examples, the predetermined maximum was $2^{10}-1$, and can be represented in 10 bits. Although the base station assigns a number less than the predetermined maximum, the base station continues to identify the subscriber station with the full standard field size, in this case 16 bits. The upper 6 bits will thus be zeros for subcarriers not supporting the embedded subfield. This configuration of the embedded subfield and shorthand CID permits full backward compatibility with legacy devices that do not support the embedded subfield.

If the base station determines at decision block 520 that the subscriber station supports the shorthand CID, the base station proceeds to block 540 and assigns a shorthand CID that is less than the predetermined maximum. However, the base station identifies the embedded subfield enabled subscriber station by its shorthand CID value, which, in the above example, is represented in 10 bits.

The base station proceeds to block 550 and enables the embedded subfield. For example, the base station can enable the embedded subfield message generator that is configured to populate the embedded subfield with power, time, and frequency feedback information related to the subscriber station supporting the shorthand CID.

Although communicating information in the CID field has been described as parsing a standard CID field into a shorthand CID field and an embedded subfield, the process of assigning a shorthand CID value to a subscriber station and reserving an embedded subfield for the communication of information is logically equivalent to assigning a block of standard CID values to the same subscriber station. Thus, in one embodiment, the CID values corresponding to the shorthand CID with all combinations of the embedded subfield can be assigned to a particular subscriber station. The shorthand CID is concatenated with one of the embedded subfield values to generate one of the set of CID values. Each CID value assigned to a subscriber station can be associated with a particular message, instruction, meaning, semantic, and the like. The subscriber station selects for use in the random access channel the particular CID value corresponding to the desired information or message.

Therefore, to support a 6-bit embedded subfield, a base station can assign 26 distinct CID values to a subscriber station. Of course, in such an embodiment, the base station need not assign a contiguous block of CID values to each subscriber station, but may populate a set of CID values with any distinct CID value from the full CID range. In a non-contiguous CID embodiment, the embedded subfield does not occupy any specific bits within the standard CID field.

A base station receiving a CID value over a random access channel can determine the subscriber station corresponding to the CID value, and utilize a look up table that maps the CID value to the desired message or meaning. Alternatively, if the set of CID values is a contiguous block, the base station can determine the subscriber station based on the lowest possible or base CID value. The base station can determine the corresponding message by subtracting the base CID value from the received CID to recover the embedded subfield.

Figure 6:
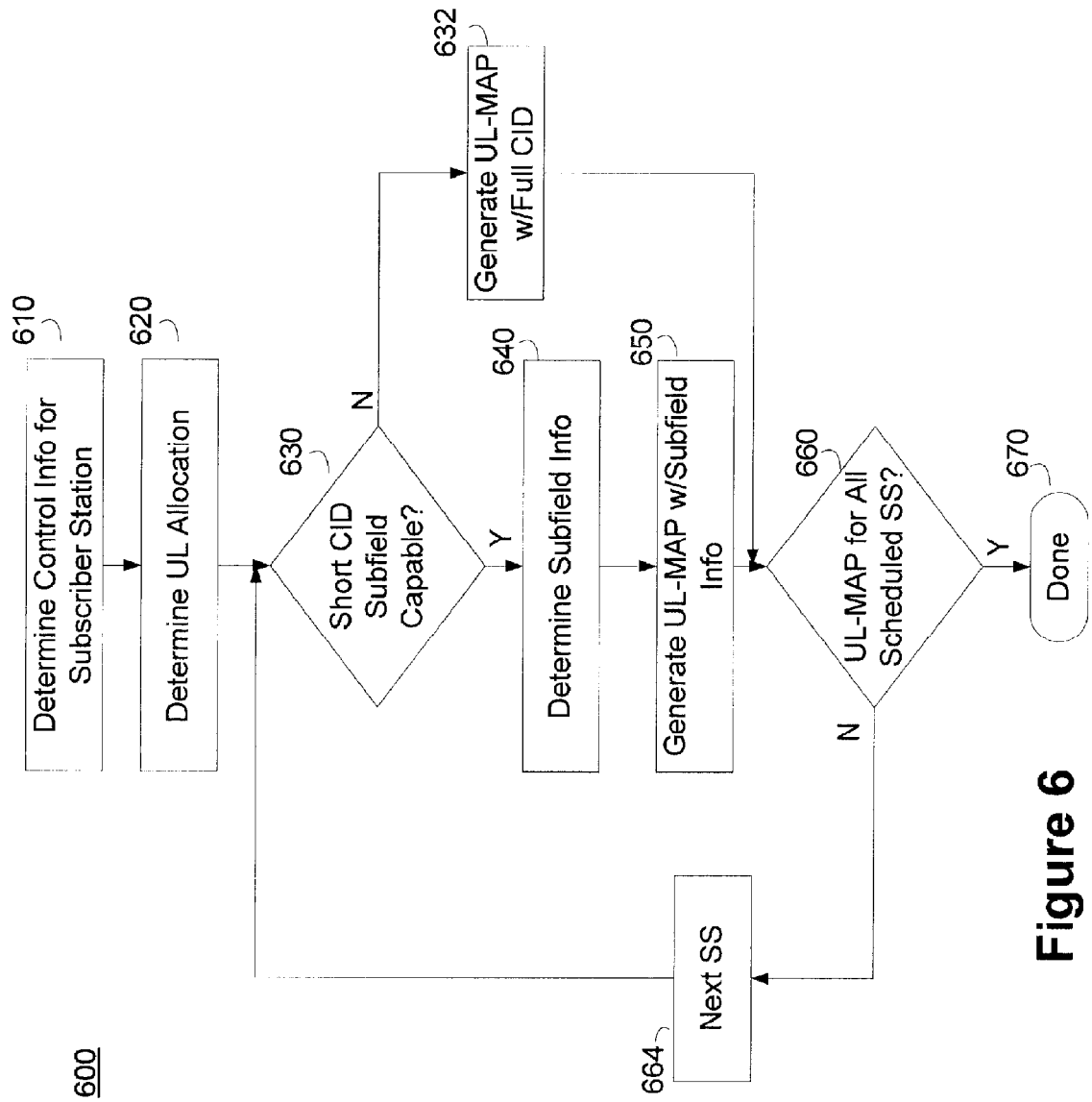
FIG. 6 is a simplified flowchart of an embodiment of a method of generating an Uplink Map with an embedded subfield.

FIG. 6 is a simplified flowchart of an embodiment of a method 600 of generating an uplink map (UL-MAP) supporting an embedded subfield. The method 600 can be performed, for example, by a base station of FIG. 1 or FIG. 2.

The method 600 begins at block 610 where the base station determines control information for one or more subscriber stations. As described above, the embedded subfield can be used to report power, time, and frequency control information to the subscriber stations. The base station can monitor the power, timing, and frequency of the uplink transmissions from each of the subscriber stations.

The base station proceeds to block 620 and determines an UL allocation for one or more subscriber stations. For example, the base station can determine a UL allocation for each subscriber station based at least in part on a predetermined algorithm. The UL allocation can correspond to a particular time, such as a next frame of information. The schedule can be based on the type of data or information being communicated on the UL and the ability of the subscriber station to buffer data for transmission in a burst or to transmit the information using a high order modulation.

After determining that one or more subscriber station are scheduled for uplink resources in the next frame, the base station proceeds to decision block 630. For a first scheduled subscriber station, the base station determines whether the subscriber station supports the embedded subfield. In particular, the base station can determine whether the subscriber station supports the shorthand CID format.

If the base station determines that the subscriber station does not support the embedded subfield, the base station proceeds from decision block 630 to block 632 and addresses the subscriber station in the UL-MAP using the full standard field length. That is, the base station addresses the subscriber station using the full 16 bits specified for a CID by the system standard. The base station then proceeds to decision block 660.

If the base station, at decision block 630, determines that the subscriber station does support the embedded subfield, the base station proceeds to block 640. At block 640, the base station determines the information to be includes in the embedded subfield message. The control message can be a PTF message generated from the subscriber station parameters monitored by the base station. For example, the base station can monitor the received power from the subscriber station and generate a 2-bit control message that indicates to the subscriber station the need to increase or decrease the transmit power, and some indication of a step size to use. The base station can monitor the arrival time of the packet transmitted by the subscriber station. The base station can compare the arrival time against a scheduled arrival time, and can generate a 2-bit timing control message that directs the subscriber station to advance or retard (delay) the subsequent packets. The message may also provide some indication of the time increment in which to advance or delay the subsequent transmission. Similarly, the base station can monitor the received frequency from the subscriber station and generate a 2-bit control message that indicates to the subscriber station the need to increase or decrease the frequency. The message can supply some indication as to the magnitude of the desired change.

The base station proceeds to block 650 and generates the portion of the UL-MAP with the shorthand CID of the subscriber station and embedded subfield information. The base station concatenates the embedded subfield message to the shorthand CID. In one embodiment, the base station associates the PTF message corresponding to the embedded subfield. In another embodiment, the base station associates the PTF message for some other subscriber station. The identity of the other base station can be determined based in part on the position in the UL-MAP of the allocation to the present subscriber station and the position in the prior UL-MAP of the allocation to the other subscriber station. If the two UL-MAP positions coincide, the base station associates the control message for the other subscriber station with the shorthand CID in the present UL-MAP.

The base station proceeds to decision block 660. In block 660, the base station determines whether the UL-MAP has been generated for all scheduled subscriber stations. If so, the base station proceeds to block 670 and is done generating the UL-MAP having the embedded subfield.

If, at decision block 660, the base station determines that not all scheduled subscriber stations have been examined for an embedded subfield map, the base station proceeds to block 664. At block 664, the base station retrieves the identity of the next subscriber station to be allocated UL resources in the present UL-MAP. The base station proceeds back to decision block 630 to examine it for the ability to support the embedded subfield. The base station continues to examine subscriber stations for the ability to support the embedded subfield until all scheduled subscriber stations have been examined.

Figure 7:
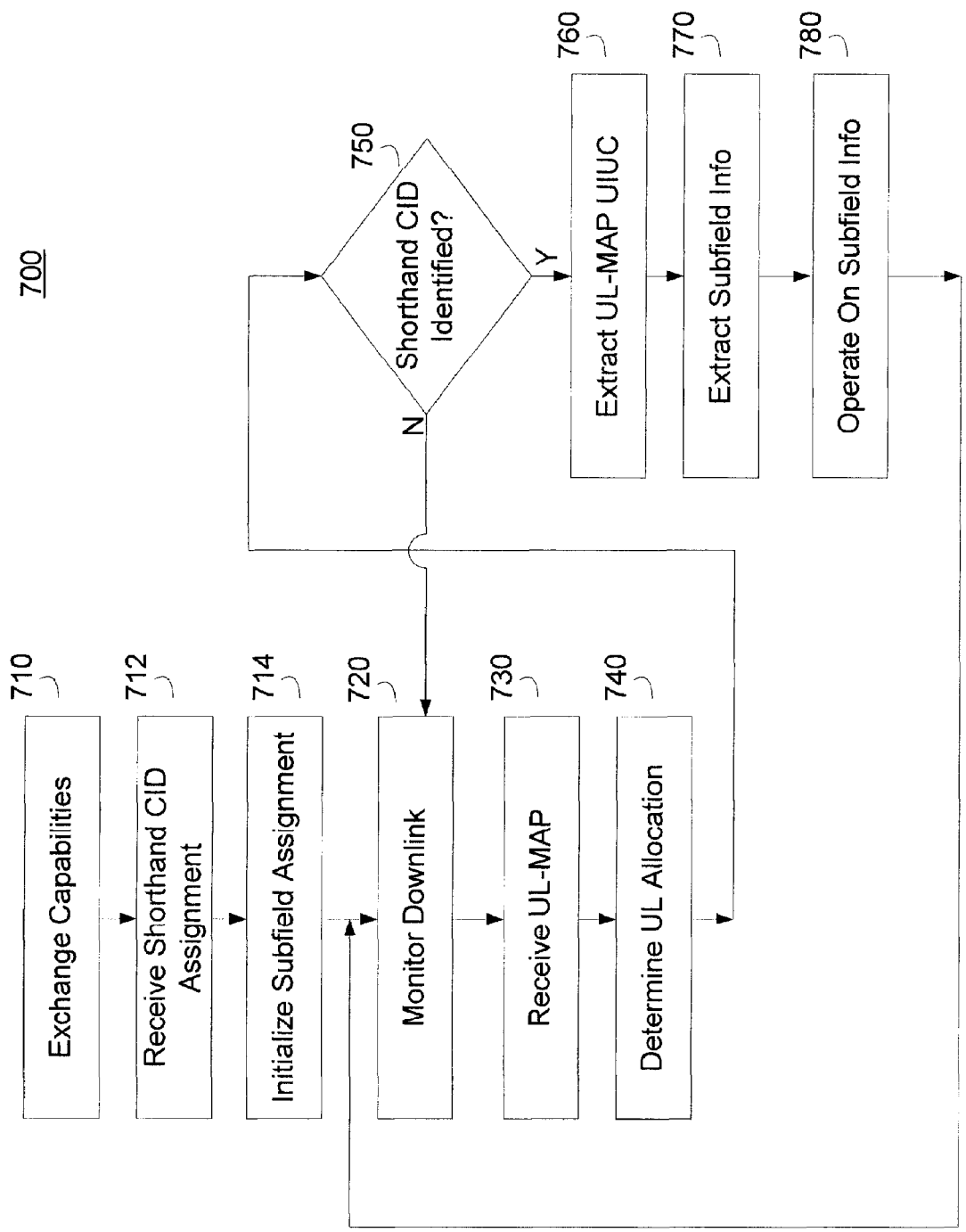
FIG. 7 is a simplified flowchart of an embodiment of a method of processing an Uplink Map having an embedded subfield.

FIG. 7 is a simplified flowchart of an embodiment of a method 700 of processing an Uplink Map having an embedded subfield. The method 700 can be performed by a subscriber station having the capability to process the embedded subfield information, such as a subscriber station of FIG. 1 or FIG. 4. The method 700 describes the condition where both the subscriber station and the communicating base station support the embedded subfield.

The method 700 begins at block 710 where the subscriber station engages in a capability negotiation with the base station when registering with the base station. The subscriber station exchanges capabilities with the base station to inform the base station of its ability to support the embedded subfield and to determine if the base station also supports the embedded subfield.

After confirming the capabilities, the subscriber station proceeds to block 712 and receives from the base station a shorthand CID assignment. In one embodiment, the standard field length of the CID is 16 bits and the shorthand CID has a length of 10 bits.

After receiving the short CID assignment, the subscriber station proceeds to block 714 and optionally receives from the base station an embedded subfield assignment. In some embodiments, the embedded subfield format can be any one of a plurality of formats. The base station can select a particular embedded subfield format for use in communications with the subscriber station. The subscriber station can receive a message that assigns a particular format to the embedded subfield. For example, the subscriber station can receive a message from the base station that informs the subscriber station that the embedded subfield carries power, time, and frequency information, and that the embedded subfield information is relevant for the shorthand CID to which it is appended. Alternatively, the format of the embedded subfield message may be predetermined, and the subscriber station does not need to be expressly informed of the format.

The subscriber station initializes monitoring of the embedded subfield and directs the appropriate resources for processing the received embedded subfield based at least in part on the format of the embedded subfield. The subscriber station proceeds to block 720 and monitors the downlink. The subscriber station may receive information and data in the downlink and can process the communications accordingly. The subscriber station proceeds to block 730 and receives a UL-MAP periodically. For example, the subscriber station may receive a UL-MAP within each downlink frame.

The subscriber station proceeds to block 740 and processes the received UL-MAP to determine if the UL-MAP allocates uplink resources to the subscriber station. The subscriber station processes the UL-MAP to determine if the shorthand CID corresponding to the subscriber station is included in the UL-MAP. The subscriber station need only examine the shorthand CID field and can at least temporarily ignore the upper bits of the standard field for the CID. Because the upper bits, for example the upper six bits, correspond to the embedded subfield, the subscriber does not need to process these bits unless the subscriber station is identified in a shorthand CID field.

The subscriber station proceeds to decision block 750 and determines whether the shorthand CID corresponding to the subscriber station is included in a UL-MAP. If the subscriber station determines that its shorthand CID value is not included in the UL-MAP, the subscriber station proceeds back to block 720 to continue monitoring the downlink. If the subscriber station determines, at decision block 750, that its shorthand CID value is included in the UL-MAP, the subscriber station proceeds to block 760.

At block 760, the subscriber station begins processing the UL-MAP and the embedded subfield. At block 760 the subscriber station extracts the UIUC corresponding to the subscriber station. The UIUC includes the UL resource allocation.

The subscriber station proceeds to block 770 and extracts the embedded subfield message. In one embodiment, the subscriber station extracts the embedded subfield message that is appended to its shorthand CID. In another embodiment, the subscriber station monitors an embedded subfield message based on information conveyed, either directly or indirectly, in the present UL-MAP. For example, the position of the subscriber station's shorthand CID in the UL-MAP may identify the position of the embedded subfield message in a subsequent UL-MAP.

After extracting the embedded subfield message, the subscriber station proceeds to block 780 and operates on the embedded subfield message. For example, the subscriber station can update a power control loop, a frequency tracking loop, and a timing advance based in part on the feedback provided in the control message. When this operation is complete, the subscriber station returns to step 720 to continue monitoring the downlink.

A dynamically allocated embedded subfield and systems and methods for generating, communicating, and processing information for a dynamically allocated embedded subfield are described. The dynamically allocated embedded subfield can be configured to be backward compatible. In one embodiment, an embedded subfield is allocated in a portion of a standard field. For example, a PTF control message can be generated and communicated to subscriber stations using a shorthand CID that occupies fewer than the full standard field. Various formats for the PTF message allow it to have a relevance of N, N+1, of some other time relevance.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of dynamically allocating an embedded subfield in a base station, the method comprising:
    the base station allocating to a subscriber station a shorthand connection Identifier (CID) having a shorthand CID length that is less than a length of a standard CID field, wherein the length of the standard CID field is 16 bits;
    the base station placing the shorthand CID in a portion of the standard CID field;
    the base station allocating the embedded subfield to a portion of the standard CID field in which the shorthand CID has not been placed;
    the base station placing information other than the shorthand CID in the embedded subfield; and
    the base station transmitting the standard CID field, including the shorthand CID and the embedded subfield, to the subscriber station.

2. The method of claim 1, wherein the shorthand CID is uniquely associated with a connection.

3. The method of claim 1, wherein the shorthand CID length is 10-bits.

4. The method of claim 1, wherein the base station places the shorthand CID in a least significant position of the standard CID field.

5. The method of claim 1, wherein allocating the embedded subfield comprises allocating the embedded subfield to the unallocated portion of the standard CID field during a predetermined message.

6. The method of claim 1, wherein the shorthand CID and the embedded subfield occur in an Uplink Map (UL-MAP) message.

7. The method of claim 1, wherein allocating the embedded subfield comprises allocating a control feedback embedded subfield.

8. The method of claim 1, further comprising:
    the base station monitoring at least one parameter of a transmission of the subscriber station; and
    the base station generating a feedback control information based on the at least one parameter;
    wherein the base station placing the information other than the shorthand CID in the embedded subfield comprises placing a control message based on the feedback control information to the subscriber station in the embedded subfield.

9. The method of claim 1, further comprising:
    the base station monitoring a transmission of the subscriber station; and
    the base station generating a control message having at least one of power, time or frequency feedback information,
    wherein the base station placing the information other than the shorthand CID in the embedded subfield comprises placing the control message in the embedded subfield.

10. The method of claim 1, further comprising:
    the base station placing information other than the shorthand CID or any portion of the standard CID field in the embedded subfield.

11. The method of claim 1, wherein the information other than the shorthand CID does not include a portion of the standard CID field.

* * * * *